Patented May 3, 1938

2,116,167

UNITED STATES PATENT OFFICE 2,116,167

PROCESS OF PREPARING A PHOSPHORESCENT MATERIAL

Hermann Espig, Bitterfeld, Germany, assignor to I. G. Farbenindustrie Aktiengesellschaft, Frankfort-on-the-Main, Germany No Drawing. Application January 6, 1933, Serial No. 650,591. In Germany January 14, 1932

3 Claims. (Cl. 134—47)

The present invention relates to a method of preparing a weatherproof phosphorescent material.

Known luminous substances which strongly luminesce for a prolonged time consist of alkaline-earth metal sulfides; these effloresce very readily and decompose in the presence of water. The luminescent masses produced from zinc sulfide which are less sensitive to moisture than are the said sulfides, lose their intensity of luminescence quickly so that they cannot be used for industrial purposes.

I have found that weatherproof luminous substances having good fluorescent and phosphorescent properties can be obtained by intimately mixing pure aluminium oxide with the pure oxide of a bivalent metal, for instance calcium, beryllium or magnesium, and an exceeding small quantity of an exciter, and subjecting this mixture—being hereinafter called the base mixture—to a high temperature. It is essential to use as starting materials such compounds as have been brought to a very pure condition, for instance to the degree of purity usual in the determination of atomic weights. Particular care must be taken that iron and copper are absent as far as possible. It is, for instance, advisable to keep the content of iron below 0.002 per cent. and the content of copper below 0.0001 per cent. It may be pointed out that the purer the starting materials, the finer is the luminescent effect obtained.

Instead of the metal oxides there may be used substantially pure compounds which are decomposed by heat to yield the metal oxides.

The base mixture may be heated to about 1000° C. until sintering occurs or in the manner employed in the manufacture of artificial spinels to about 2000° C. until fusing occurs. The base mixture is, for instance, introduced into the oxyhydrogen flame or coal gas flame of a so-called Verneuil furnace used in making phosphorescent masses from silicates. It is a surprising fact that the luminescent substances composed for instance of $3Al_2O_3.MgO$, i. e. spinels, acquire a good, durable luminescence and especially a good phosphorescence on addition of a compound of a metal as an exciter because there has hitherto been known only a weak phosphorescence of certain natural spinels lasting only for a fraction of a second.

By the term exciter is to be understood, as usual, a compound of a metal by which the base substance is influenced in such a manner that certain wave lengths of the incident light are absorbed and radiated again in the form of rays of longer wave length, either during the irradiation (fluorescence) or afterwards (phosphorescence). By the term "luminescence" there is to be understood fluorescence as well as phosphorescence. As exciting metals manganese, nickel, rubidium and bismuth are particularly useful and are according to the invention preferably used in quantities substantially below about 1 per cent. of the total base mixture.

When a compound of a readily volatilizable metal is to be used as an exciter, it is advisable to add to the mixture a compound capable of forming with the said metal a difficultly volatilizable compound. The exciter may, for instance, be converted into a zincate or an orthozinc titanate which is then introduced in a corresponding quantity into the base substance. For this purpose for instance a zinc compound, such as zinc oxide, or a titanium compound, such as titanium oxide, is added together with the exciter and in proportion thereto. By these additions the exciter is probably converted in the heating zone into a zincate, titanate or orthozinc titanate.

The term "phosphorescence" is not intended to exclude fluorescence which often occurs, the more so as in the case of shortlived momentary centres of luminosity there is a transition state where phosphorescence cannot exactly be distinguished from fluorescence.

The following examples serve to illustrate the invention, but they are not intended to limit it thereto, the parts being by weight:

(1) 76.7 grams of purest calcium oxide are intimately ground together with 207 grams of well purified ammonia alum. To the mixture there are added 20 grams of lithium carbonate, 10 grams of sodium sulfate and 10 grams of potassium sulfate in order to reduce the fusing temperature of the mixture; furthermore 0.3 gram of bismuth metal in form of bismuth nitrate is added. The mixture is heated for about 10 minutes to about 1200° C. The weatherproof pulverulent product shows a bluish fluorescence and a whitish blue phosphorescence.

(2) A mixture of 110 parts of magnesium sulfate ($MgSO_4+7H_2O$) and 1100 parts of $$Al(NH_4)(SO_4)_2.12H_2O$$

is calcined first at a temperature up to about 900° C. together with about 6 per cent. of manganese peroxide; the mixture is then introduced in small quantities into the oxyhydrogen flame of a Verneuil furnace. There are obtained weatherproof crystals having good fluorescent and phosphorescent properties.

(3) A mixture of 74 grams of magnesium sulfate ($MgSO_4.7H_2O$) and 272 grams of $$Al(NH_4)(SO_4)_2.12H_2O$$

is impregnated with a solution which contains further 0.035 per cent. of manganese in form of the soluble salts. The mixture is first calcined at 900° C. and then sintered for about 10 minutes at 1400° C. There is produced a practically colorless, crystalline weatherproof powder which shows a very vigorous carmine red fluorescence.

(4) An intimate mixture of 316 grams of ammonium alum ($Al(NH_4)(SO_4)_2.12H_2O$), 27 grams of magnesium sulfate ($MgSO_4.7H_2O$), 0.076 gram of manganese in the form of $MnSO_4$, 0.4 gram of zinc oxide in the form of $ZnSO_4$ is first calcined at a temperature not exceeding 900° C. The loose dull red oxide powder thus obtained is then slowly introduced in small quantities into the oxyhydrogen flame, burning with an excess of hydrogen, of a Verneuil furnace.

There are obtained weatherproof spinel crystals having beautiful green fluorescent and phosphorescent effects.

(5) 316 grams of ammonium alum $$(Al(NH_4).(SO_4)_2.12H_2O),$$

27 grams of magnesium sulfate ($MgSO_4.7H_2O$), 0.8 gram of manganese in the form of manganese sulfate, 0.4 gram of zinc oxide in form of zinc sulfate are intimately mixed together and the mixture is first calcined at a temperature not exceeding 900° C. The loose dull red oxide powder is then slowly introduced in small quantities into the oxy-hydrogen flame, burning with an excess of hydrogen, of a Verneuil furnace.

The weatherproof spinel crystals thus obtained show chiefly fluorescence, phosphorescence occurring simultaneously.

I claim:

1. Process of preparing waterproof materials having good phosphorescent properties, which comprises intimately mixing a major proportion of an aluminum compound of the group consisting of alumina and a salt of aluminum which is thermally decomposable to yield alumina, a relatively very small amount of a compound of a metal selected from the group consisting of manganese, nickel, rubidium and bismuth, said compound being a member of the group consisting of oxides and salts which are thermally decomposable to yield oxides, and an intermediate and minor amount of a compound of a metal of the group consisting of calcium, beryllium and magnesium, said compound being a member of the group consisting of oxides and salts which are thermally decomposable to yield oxides, the three ingredients having been brought to such a purity that they contain less than 0.002% of iron and less than 0.0001% of copper, and subjecting the resulting mixture to a heating treatment at a temperature at least sufficient to sinter the same.

2. Process as defined in claim 1, characterized in that the mixture includes also a relatively small amount of an oxide of a metal of the group consisting of zinc and titanium, said metal oxide having such a purity that it contains less than 0.002% of iron and less than 0.0001% of copper.

3. Process as defined in claim 1, characterized in that the heating treatment includes two steps in the first of which the mixture is calcined at a temperature not in excess of about 900° C., whereby a loose oxide powder is produced, and in the second of which the resulting loose powder is at least incipiently fused by heating in a "Vernueil furnace".

HERMANN ESPIG.